United States Patent
Schinski et al.

(10) Patent No.: US 8,894,818 B2
(45) Date of Patent: *Nov. 25, 2014

(54) PROCESS FOR GENERATING A HYDROCARBON FEEDSTOCK LIGNIN

(75) Inventors: William Lawrence Schinski, San Rafael, CA (US); Alexander E. Kuperman, Orinda, CA (US); Jinyi Han, Danville, CA (US); Douglas Gene Naae, Sugar Land, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 12/039,349

(22) Filed: Feb. 28, 2008

(65) Prior Publication Data

US 2009/0218061 A1 Sep. 3, 2009

(51) Int. Cl.
| | | |
|---|---|---|
| D21F 1/66 | (2006.01) | |
| D21C 11/00 | (2006.01) | |
| C10G 1/06 | (2006.01) | |
| C10L 1/02 | (2006.01) | |
| C10G 3/00 | (2006.01) | |

(52) U.S. Cl.
CPC .............. *D21C 11/0007* (2013.01); *C10G 1/06* (2013.01); *C10L 1/02* (2013.01); *C10G 3/44* (2013.01); *C10G 3/45* (2013.01); *C10G 3/47* (2013.01); *C10G 3/50* (2013.01); *C10G 2300/1014* (2013.01); *C10G 2300/1074* (2013.01)
USPC ....................................................... 162/198

(58) Field of Classification Search
None
See application file for complete search history.

(56) References Cited

U.S. PATENT DOCUMENTS

| | | | |
|---|---|---|---|
| 4,714,591 A * | 12/1987 | Avedesian | 422/140 |
| 4,739,040 A | 4/1988 | Naae et al. | |
| 4,781,251 A | 11/1988 | Naae et al. | |
| 4,787,454 A | 11/1988 | Naae et al. | |
| 4,795,841 A * | 1/1989 | Elliott et al. | 585/240 |
| 5,027,898 A | 7/1991 | Naae | |
| 5,035,288 A | 7/1991 | Kieke et al. | |
| 5,076,361 A | 12/1991 | Naae et al. | |
| 5,095,985 A | 3/1992 | Naae et al. | |
| 5,095,986 A | 3/1992 | Naae et al. | |
| 5,169,559 A | 12/1992 | Naae et al. | |
| 5,230,814 A | 7/1993 | Naae et al. | |
| 5,959,167 A | 9/1999 | Shabtai et al. | |
| 6,100,385 A | 8/2000 | Naae et al. | |
| 6,183,598 B1 * | 2/2001 | Myreen | 162/29 |
| 6,207,808 B1 | 3/2001 | Naae et al. | |
| 6,830,696 B1 | 12/2004 | El-Shall et al. | |
| 2003/0115792 A1 * | 6/2003 | Shabtai et al. | 44/605 |
| 2004/0192981 A1 | 9/2004 | Appel et al. | |
| 2006/0194990 A1 | 8/2006 | Miyoshi et al. | |
| 2007/0098625 A1 * | 5/2007 | Adams et al. | 423/484 |
| 2007/0187292 A1 * | 8/2007 | Miller et al. | 208/15 |
| 2008/0050792 A1 * | 2/2008 | Zmierczak et al. | 435/161 |
| 2008/0053870 A1 * | 3/2008 | Marker et al. | 208/67 |

FOREIGN PATENT DOCUMENTS

| | | |
|---|---|---|
| SU | 355867 | 7/1974 |
| SU | 997441 | 10/1983 |

* cited by examiner

*Primary Examiner* — Jacob Thomas Minskey
(74) *Attorney, Agent, or Firm* — Melissa Patangia; Tiffany E. Weksberg; Parul Anderson

(57) ABSTRACT

The present invention discloses processes for generating a hydrocarbon feedstock for biofuels synthesis from lignin via hydroprocessing. Embodiments of the present invention can occur in a refinery setting or in a paper mill setting. Embodiments of the present invention can utilize the separated lignin or the entire black liquor solution.

20 Claims, 6 Drawing Sheets

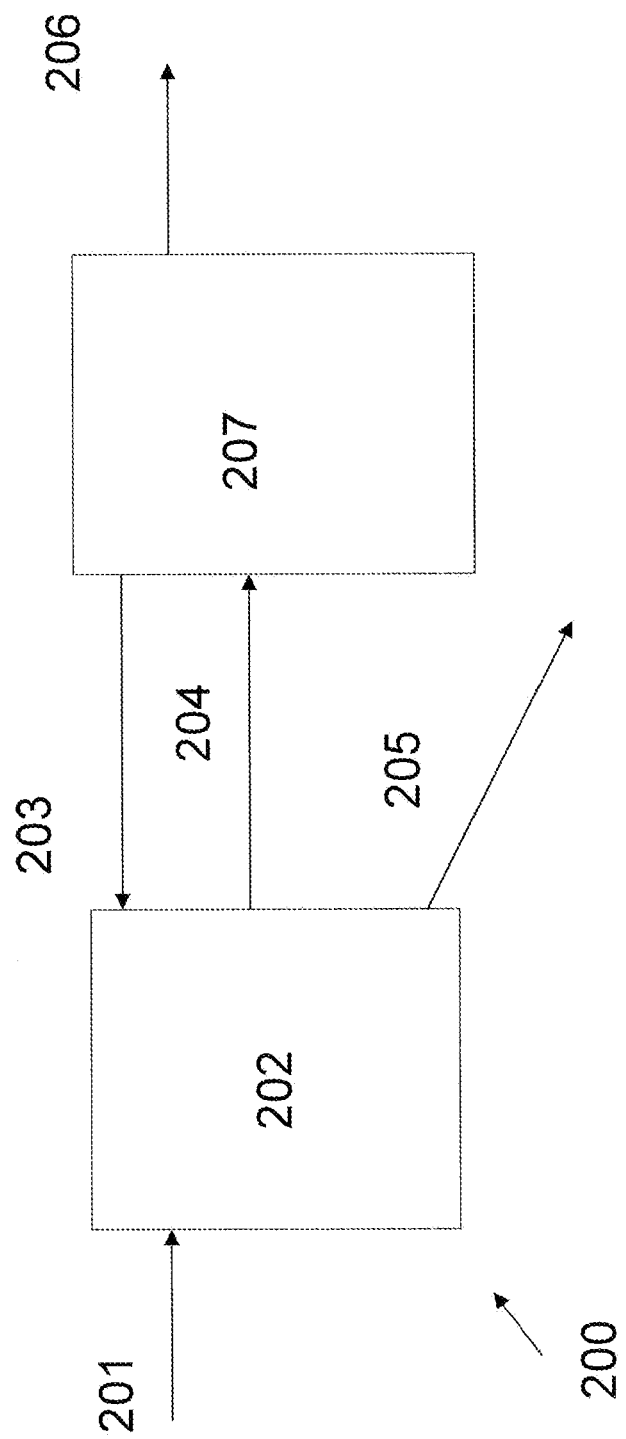

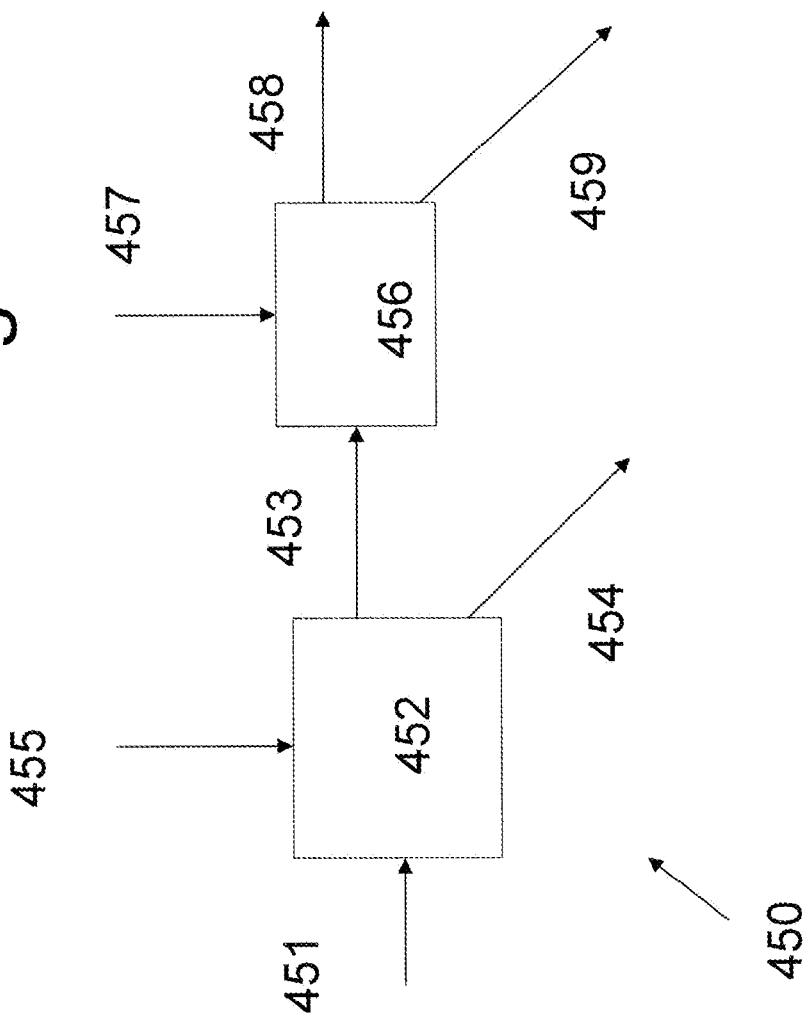

PROCESS FOR GENERATING A HYDROCARBON FEEDSTOCK LIGNIN

FIELD OF THE INVENTION

The present invention relates generally to processes for generating a biofuels feedstock from lignin, and specifically to hydroprocessing lignin to generate a hydrocarbon feedstock for biofuels synthesis.

BACKGROUND OF THE INVENTION

Initially, as a part of the kraft pulping process for making paper products, wood chips are converted to pulp by cooking the wood chips with white liquor in digesters at elevated temperature and pressure. White liquor is a water solution comprising sodium sulfide and sodium hydroxide. The white liquor dissolves the lignin that binds the cellulose fibers of the wood chips together. When cooking is complete, the contents of the digesters are sent to the pulp washers to separate the pulp from the spent cooking liquor. The separated pulp then proceeds through numerous stages until it becomes the finished paper product.

The combination of the spent cooking liquor and pulp wash water is referred to as weak black liquor. The weak black liquor is concentrated to form black liquor with a solids content of approximately 65 percent. Black liquor comprises lignin, sodium carbonate, sodium sulfate, and other inorganic salts. The weak black liquor is sent to the multiple-effect evaporator system where the black liquor is concentrated to about 55 percent solids. The black liquor is then fired in a recovery boiler to generate useful steam for the paper mill and to allow for the recovery and recycle of the cooking chemicals as green liquor. The resultant green liquor is converted back to white liquor for return to the digesters. The recovery of these costly cooking chemicals is essential to the economic operation of a paper mill. Lignin is a low value waste by-product from the papermaking industry.

The use of lignin as a renewable carbon feedstock for the synthesis of biofuels is a potential high value outlet for lignin. However, lignin is not directly useful as a refinery feedstock for biofuels synthesis. First, solid materials such as lignin are difficult to handle in conventional refinery systems that typically process liquid streams. Second, the high oxidation state of lignin (by virtue of its phenolic characteristics) means it has a low energy content compared to common refinery fuels. Third, lignin is so highly oxygenated that it is not generally compatible with hydrocarbon streams.

For these reasons, a process to generate a refinery-compatible hydrocarbon feedstock from lignin is needed. The present invention discloses a process for generating a biofuels feedstock from lignin.

SUMMARY OF THE INVENTION

In the present invention, processes for generating a biofuels feedstock from lignin are disclosed. Specifically, the process of the present invention includes hydroprocessing lignin to generate a hydrocarbon feedstock for biofuels synthesis. As a result of the hydroprocessing of the lignin, the biofuels feedstock has been reduced in oxygen content and average molecular weight relative to the lignin.

The processes of the present invention may take place at a refinery setting. In this embodiment, the lignin is first separated from the black liquor at a paper mill and then the lignin is transported from the paper mill to the refinery for hydroprocessing to generate a biofuels feedstock. In the alternative, the entire black liquor solution may be transported from the paper mill to the refinery for hydroprocessing. In either scenario, the product (i.e., the biofuels feedstock) is then introduced into the refinery for biofuels synthesis alone or in combination with other refinery streams.

In addition, the processes of the present invention may take place at a paper mill setting. In this embodiment, the separated lignin may be hydroprocessed at the paper mill and the product (i.e., the biofuels feedstock) may be transported to a refinery for biofuels synthesis. In the alternative, the entire black liquor solution may be hydroprocessed at the paper mill and the product (i.e., the biofuels feedstock) may be transported to a refinery for biofuels synthesis alone or in combination with other refinery streams.

In either setting, the black liquor may be hydroprocessed completely or the hydroprocessing may proceed in stages. In the first stage of the staged black liquor hydroprocessing embodiment, there is enough hydroprocessing to cause phase separation of the black liquor and to allow most of the water and salts to be removed. In the second stage of the staged black liquor hydroprocessing embodiment, there is complete hydroprocessing with additional water removed. This second stage can occur in a smaller reactor because most of the water in the black liquor was removed in the first stage.

In addition to lignin from kraft pulping operations, sulfite, alkaline, and organosolv pulping operations and other chemical wood pulping operations also produce lignin by-products. In addition to lignin from papermaking operations, lignin from other sources, including lignin-like equivalents, may also be hydroprocessed to generate a biofuels feedstock alone or in combination. For example, pyrolysis oil from forestry slash or other forms of biomass, in particular the water insoluble fraction of pyrolysis oil, has a lignin by-product which can be hydroprocessed. Cellulosic hydrolysis and fermentation processes for ethanol synthesis also have a lignin by-product which can be hydroprocessed.

The processes of the present invention resolve the three limitations identified above for the use of lignin as a refinery feedstock. First, hydroprocessing yields a liquid product. Second, the energy content of the product is significantly increased. Third, the product is compatible with typical refinery streams and processes.

BRIEF DESCRIPTION OF THE FIGURES

The description is presented with reference to the accompanying figures in which:

FIG. 2 depicts black liquor hydroprocessing in a refinery setting.

FIG. 4A depicts staged black liquor hydroprocessing in a paper mill setting.

DETAILED DESCRIPTION OF THE INVENTION

Figure 1:
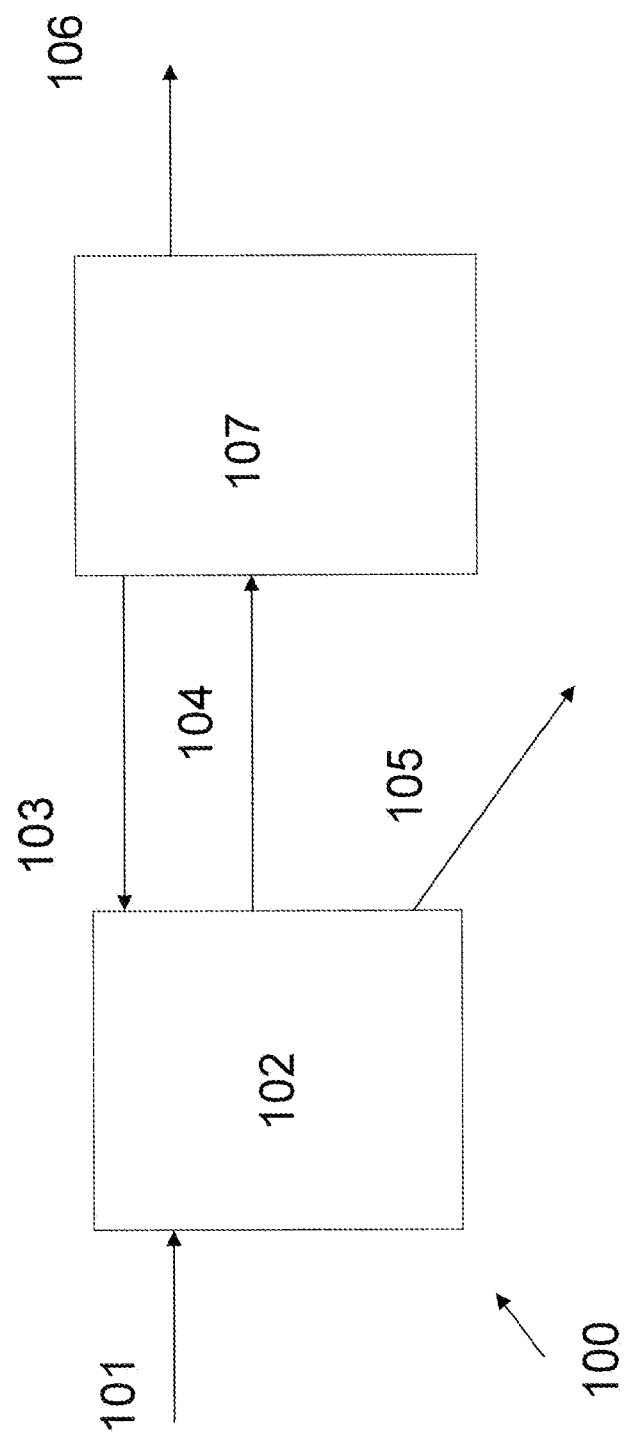
FIG. 1 depicts lignin hydroprocessing in a refinery setting.

The present invention discloses processes for generating a hydrocarbon feedstock for biofuels synthesis from lignin, including lignin-like equivalents, via complete or staged hydroprocessing. Embodiments of the present invention can take place at any setting including, but not limited to, a refinery setting or a paper mill setting. Embodiments of the present invention can utilize the separated lignin, the entire black liquor solution, or combinations thereof. The lignin, including the lignin-like equivalents, can come from a variety of sources including, but not limited to, papermaking operations, grasses, softwoods, hardwoods, pyrolysis oil from forestry slash or other forms of biomass and cellulosic hydrolysis and fermentation processes for ethanol synthesis.

1. DEFINITIONS

Certain terms are defined throughout this description as they are first used, while certain other terms used in this description are defined below:

"Biofuel," as defined herein, is a fuel product at least partly derived from "biomass."

"Biomass," as defined herein, is a renewable resource of biological origin.

"Black liquor," as defined herein, comprises spent cooking liquor and pulp wash water including dissolved lignin from wood.

A "feedstock," within the context of a refinery, and as used herein, refers to hydrocarbonaceous material fed into one or more refinery processes in order to make a fuel or other commercial product.

A "gasifier," as defined herein, refers to a reaction environment wherein condensed hydrocarbonaceous feedstock material is converted into a gas through the action of heat and possibly one or more reactive gases such as oxygen, air, carbon dioxide ($CO_2$), and/or steam.

"Hydroprocessing," as defined herein, generally refers to reactions in the presence of a catalyst and hydrogen at high temperature and pressure for modification of hydrocarbonaceous material by saturation, isomerization, heteroatom removal, cracking, and the like. Hydrocracking and hydrotreating are examples of hydroprocessing reactions.

"Lignin," as defined herein, refers to a group of phenolic polymers that bind the cellulose fibers of wood together. Lignin can come from a variety of sources including, but not limited to, paper mills. In addition, lignin, including the lignin-like equivalents, can come from pyrolysis oil from forestry slash or other forms of biomass, cellulosic hydrolysis and fermentation processes for ethanol synthesis, grasses, softwoods, and hardwoods.

A "paper mill," as defined herein, generally refers to an integrated papermaking operation which manufactures paper products from wood chips utilizing chemical wood pulping such as the kraft pulping process.

"Pyrolyzing," as defined herein, refers to a thermal processing and/or thermal decomposition of hydrocarbonaceous material, wherein said decomposition is typically carried out in a non-oxidative environment.

"Pyrolysis oil," or "pyoil," as defined herein, refers to a liquid hydrocarbon product resulting from the pyrolysing treatment of hydrocarbonaceous material. In addition to other sources of pyrolysis oil, pyrolysis oil can also be generated from forestry slash.

A "refinery," as defined herein, generally refers to an oil refinery, or aspects thereof, where crude oil (or other fossil fuels such as coal or natural gas) is processed. Processes carried out at such refineries include, but are not limited to, reforming, cracking, distilling, and the like. In addition to an oil refinery, a refinery also refers to a biofuels refinery.

"Refinery residual" or "refinery resid," as defined herein, generally refers to the heaviest crude-based by-product fractions produced at a refinery. Asphaltenes, coker coke, and vacuum gas oil are types of refinery residuals.

"Synthesis gas," or "syngas," as defined herein, generally refers to a mixture of carbon monoxide (CO) and hydrogen ($H_2$) produced by gasification in a gasifier. General oxidative routes from hydrocarbons to syngas are as follows:

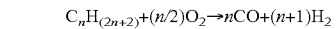

$$C_nH_{(2n+2)}+(n/2)O_2 \rightarrow nCO+(n+1)H_2$$

"White liquor," or "cooking liquor," as defined herein, comprises a water solution of sodium sulfide and sodium hydroxide.

2. METHOD

Refinery Setting

In the refinery setting embodiment, either lignin or black liquor may be transported to the refinery from a paper mill for complete or staged hydroprocessing to generate a biofuels feedstock. In either scenario, the product, the biofuels feedstock, is then introduced into the refinery for biofuels synthesis. The lignin may come from paper mill sources but it may also include lignin from other sources, including lignin-like equivalents, from sources such as pyrolysis oil from forestry slash or other forms of biomass and cellulosic hydrolysis and fermentation processes for ethanol synthesis.

In the first refinery setting embodiment as depicted in FIG. 1, a hydroprocessor 102 is located on site at a refinery 100. Lignin 101 is transported to the refinery 100 from a paper mill (not shown). In this embodiment, prior to transportation to the refinery 100, the lignin 101 is separated from the black liquor on site at the paper mill. One method for the isolation of lignin 101 from black liquor is by carbon dioxide ($CO_2$) injection. The injection of $CO_2$ lowers the pH of the black liquor and causes the lignin to precipitate. After rinsing the lignin 101 with dilute sulfuric acid and drying, the lignin 101 can be obtained as a dry solids and transported to the refinery 100. Testing on samples of wet lignin (lignin moist with black liquor solution) reveals that the pH is basic. Testing on samples of clean lignin (lignin separated from the black liquor) reveals that the pH is acidic. The pH of the lignin is a function of the black liquor on the lignin.

Once at the refinery 100, the lignin 101 is introduced into the hydroprocessor 102. Hydroprocessing includes hydrocracking and hydrotreating wherein large molecules, such as lignin, are converted into smaller molecules, such as a biofuels feedstock, using a reductant 103 and a catalyst at high temperature and pressure. Examples of hydroprocessing catalysts include molybdenum, cobalt, nickel, tungsten, iron and/or platinum on an amorphous or crystalline oxide matrix. Optionally a hydrocarbon solvent (not shown) can also be added as a slurry for the catalyst.

After the introduction of the lignin 101 and the catalyst into the hydroprocessor 102, the reductant 103 is pressurized into the hydroprocessor 102. One example of a reductant 103 for the hydroprocessor 102 is hydrogen. In the refinery setting, the hydrogen can be obtained from the same source providing hydrogen for other refinery processes 107. In addition, the reductant for the hydroprocessor could also be syngas. The presence of carbon monoxide in the syngas can assist with the conversion of lignin 101, and the observed effect is similar to that seen for coal hydroprocessing with syngas compared to hydrogen alone.

Unlike coal or heavy crude oil hydroprocessing, significant amounts of water 105 are produced as a result of lignin 101 hydroprocessing. This is due to the fact that lignin 101 is oxygenated to a much greater degree than coal or heavy crude oil. However, tests have shown that this produced water does not inhibit the lignin 101 conversion. At the end of the reaction the water 105 will condense and phase separate from the biofuels feedstock 104. The water 105 extracts any residual salts that may be present in the lignin 101, thereby preventing fouling or deactivation of the catalyst. After the separation from the water 105, the biofuels feedstock 104 will also be separated and filtered to remove the catalyst for recycle (not shown).

In an exemplary embodiment, the hydroprocessing comprises activated slurry hydrocracking with a molybdenum sulfide heterogeneous catalyst at approximately 2000 psi with hydrogen for about six hours.

At the end of the reaction, the product, the biofuels feedstock 104 (from the hydroprocessor 102) is introduced into the refinery processes 107 to produce a biofuel 106. The particular location of the introduction of the biofuels feedstock 104 within the refinery processes 107 will depend on the composition of the biofuels feedstock 104. The biofuels feedstock 104 will be primarily a diesel-like stream.

Refinery residuals may also be introduced into the hydroprocessor 102 with the lignin 101 for the production of a biofuels feedstock 104.

Further, in addition to lignin from papermaking operations, lignin, including lignin-like equivalents, from other sources may also be introduced into the hydroprocessor 102 to generate a biofuels feedstock 104. For example, after logging, a paper mill may send waste (known as forestry slash) to a pyrolysis unit for the production of pyrolysis oil. This pyrolysis oil contains a lignin fraction and therefore may also be hydroprocessed. The pyrolysis oil comprises a water soluble portion and a water insoluble portion. As a result, the pyrolysis oil can be condensed and separated with a water wash. The water insoluble portion will require less hydrogen and will make a better fuel. The water soluble portion can be sent to aqueous phase reforming or to a gasifier. Similarly, cellulosic hydrolysis and fermentation processes for ethanol synthesis also have a lignin by-product that can be hydroprocessed.

One common issue associated with the production of biofuels is the need to maximize the feedstock volume. Co-feeding other material such as dried biomass, pyrolysis oil, and refinery residuals as needed with the lignin 101 will address this issue. It is expected that these materials will be compatible feedstocks for the hydroprocessor 102.

In the second refinery setting embodiment, as depicted in FIG. 2, whole or partially dewatered black liquor 201 is transported to refinery 200 from a paper mill (not shown). Once at the refinery 200, the black liquor 201 is introduced into hydroprocessor 202 for complete hydroprocessing. The hydroprocessing occurs using a reductant 203 and a catalyst at high temperature and pressure. Examples of hydroprocessing catalysts include molybdenum, cobalt, nickel, tungsten, iron and/or platinum on an amorphous or crystalline oxide matrix. Optionally a hydrocarbon solvent (not shown) can also be added as a slurry for the catalyst. Next, the reductant 203 is pressurized into the hydroprocessor 202. Like the lignin embodiment above, hydrogen or syngas from refinery processes 207 may be used as the reductant 203.

Significant amounts of water will be produced as a result of the black liquor 201 hydroprocessing. At the end of the reaction, the biofuels feedstock 204 is no longer miscible with water 205 and separates upon cooling to a second phase which is then separated and filtered to remove the catalyst for recycle (not shown). The biofuels feedstock 204 is then sent to the refinery processes 207 to produce a biofuel 206. The particular location of the introduction of the biofuels feedstock 204 within the refinery processes 207 will depend on the composition of the biofuels feedstock 204. The biofuels feedstock 204 will be primarily a diesel-like stream. In addition, the biofuels feedstock 204 may be separated into fractions and each fraction sent to the appropriate refinery process.

In addition, like the lignin embodiment above, in this embodiment, dried biomass, pyrolysis oil, or refinery residuals may also be introduced into the hydroprocessor 202 with the black liquor 201 for the production of a biofuels feedstock 204. However, it is anticipated that the introduction of pyrolysis oil may cause the lignin in the black liquor to precipitate. Therefore, the pyrolysis oil will typically have to be introduced slowly during the reaction or the pyrolysis oil may have to be added with a solvent to slurry the lignin.

The water 205 from the hydroprocessing reaction contains caustic salts that may be recycled to the papermaking process as the equivalent of green liquor or alternatively further treated (i.e., sent to a boiler) to reduce the organic components and reject the dissolved carbon dioxide. This is an alternative pathway to recycle the cooking chemicals required in the papermaking process.

While it may be less costly to ship dried lignin versus whole black liquor, hydroprocessing whole black liquor has the potential to increase the utilization of the organic components of black liquor. The carbon dioxide precipitation process discussed above to filter solid lignin from black liquor involves a titration to prevent the terpene, including pinene, and the tall oil fractions or other oily materials in the black liquor from being driven out of the solution. Both terpene and tall oil are oily materials capable of wetting the lignin and yield a tacky or oily product that would be difficult to handle. As a result, some lignin is unavoidably left in the black liquor which—reducing the separation yield. In addition, the terpene and tall oil fractions are not utilized. By hydroprocessing the whole black liquor as an aqueous solution, a higher overall yield of biofuels feedstock will be harvested from the black liquor. In addition, the costly lignin separation from black liquor is also avoided.

Figure 2A:
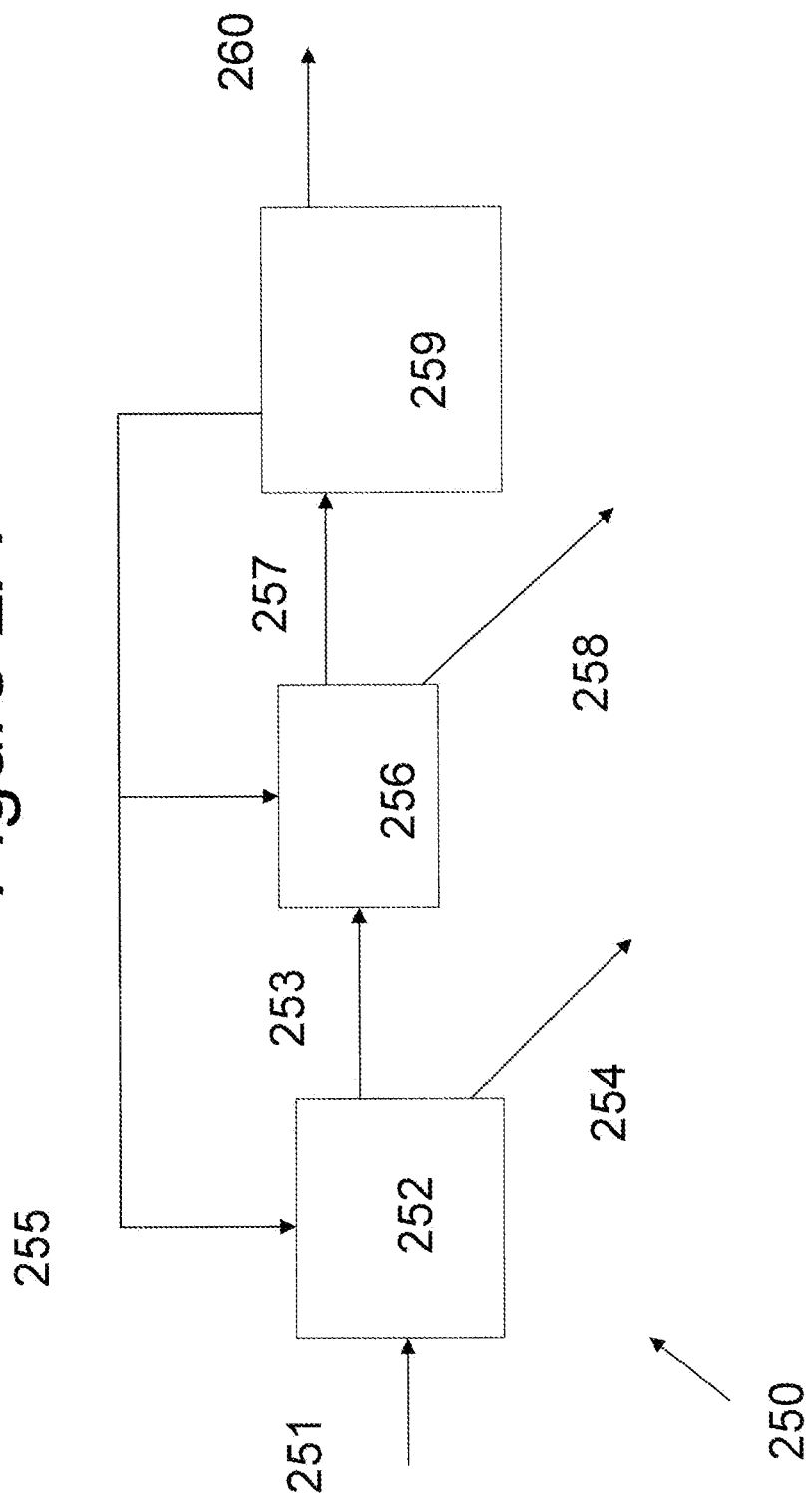
FIG. 2A depicts staged black liquor hydroprocessing in a refinery setting.

In the third refinery setting embodiment, as depicted in FIG. 2A, whole or partially dewatered black liquor 251 is transported to the refinery 250 from a paper mill (not shown) for staged hydroprocessing. In this embodiment, there are two stages. Staged hydroprocessing may comprise a plurality of stages. Once at the refinery 250, the black liquor 251 is introduced into the first hydroprocessing stage 252. In this embodiment, the first hydroprocessing stage 252 is used as a separation tool to separate the lignin 253 from the water and salts 254. The hydroprocessing reaction, in the presence of a catalyst and a reductant 255, proceeds only far enough to cause phase separation and allow most of the water and salts 254 to be removed. Unlike the complete hydroprocessing embodiment described above, the resulting stream from this staged hydroprocessing embodiment, the separated lignin 253, is not primarily a diesel-like stream. Next, the separated lignin 253 is introduced into the second hydroprocessing stage 256 for complete hydroprocessing in the presence of a catalyst and a reductant 255.

At the end of the second hydroprocessing reaction, the biofuels feedstock 257 is no longer miscible with water 258 and separates upon cooling to a second phase that is then separated and filtered to remove the catalyst for recycle (not shown). The biofuels feedstock 257 is then sent to the refinery processes 259 to produce a biofuel 260. The particular location of the introduction of the biofuels feedstock 257 within the refinery processes 259 will depend on the composition of the biofuels feedstock 257. The biofuels feedstock 257 will be primarily a diesel-like stream.

3. METHOD

Paper Mill Setting

In the paper mill setting embodiments, either lignin or black liquor may be hydroprocessed to generate a biofuels feedstock. In either scenario, the product, the biofuels feedstock, may be transported to a refinery for biofuels synthesis. The hydroprocessing can be complete or staged. The lignin will come from paper mill sources but it may also include lignin, including lignin-like equivalents, from other sources such as pyrolysis oil from forestry slash or other forms of biomass and cellulosic hydrolysis and fermentation processes for ethanol synthesis.

Figure 3:
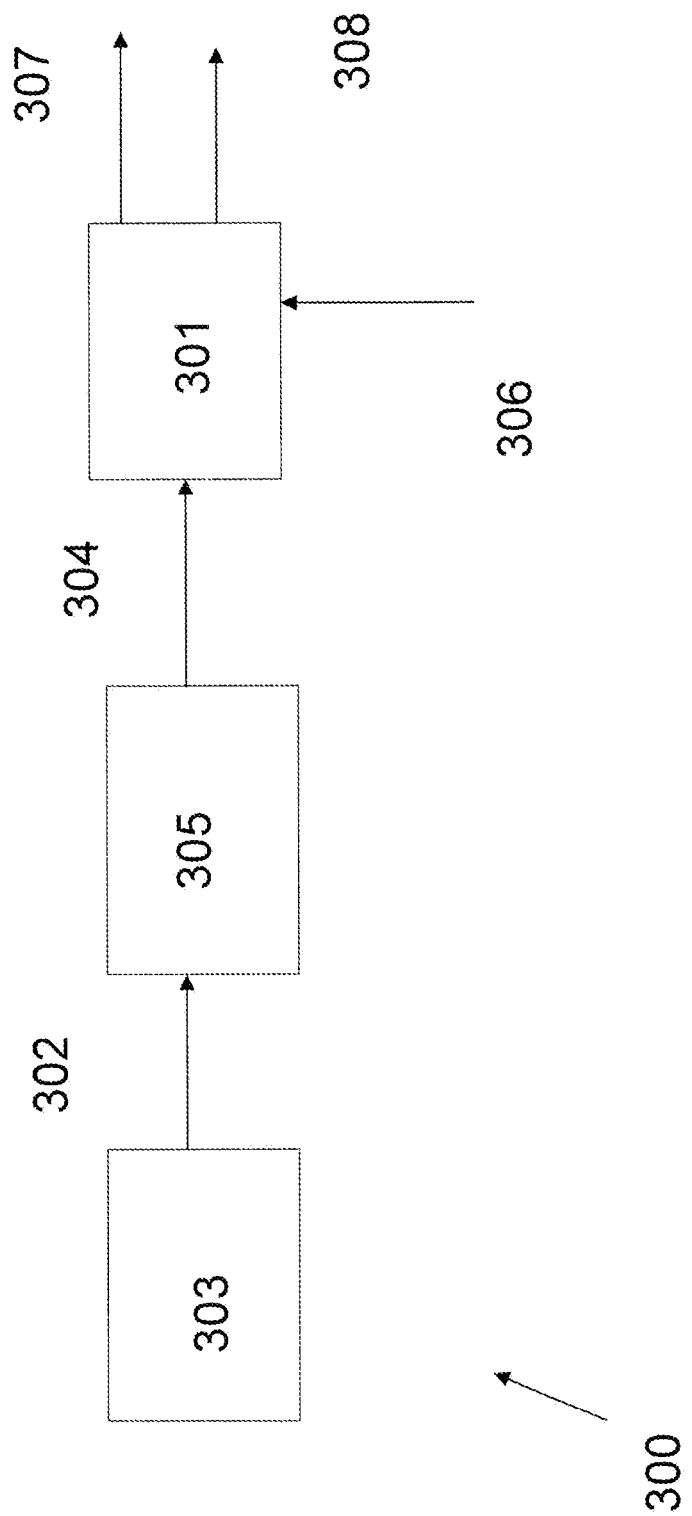
FIG. 3 depicts lignin hydroprocessing in a paper mill setting.

In the first embodiment at the paper mill setting, as depicted in FIG. 3, a hydroprocessor 301 is located on site at a paper mill 300. Black liquor 302 exits the pulp washers 303. The lignin 304 is separated 305 from the black liquor 302 prior to entering the hydroprocessor 301. For example, the lignin 304 may be separated from the black liquor 302 via carbon dioxide injection as described above.

The lignin 304 is then introduced into the hydroprocessor 301 to generate the biofuels feedstock 307. The hydroprocessing occurs using a reductant 306 and a catalyst at high temperature and pressure. Examples of hydroprocessing catalysts include molybdenum, cobalt, nickel, tungsten, iron and/or platinum on an amorphous or crystalline oxide matrix. Optionally, a hydrocarbon solvent (not shown) can also be added as a slurry for the catalyst. Next, the reductant 306 is pressurized into the hydroprocessor 301.

One example of a reductant 306 for the hydroprocessor 301 is hydrogen. While hydrogen will already be present in the refinery setting as discussed above, at the paper mill 300 the hydrogen would have to be generated solely for use in the hydroprocessor 301.

In one embodiment, the hydrogen could be generated from anhydrous ammonia ($NH_3$). Ammonia is widely used in agriculture and is available from a distributed supply network. Catalytic decomposition of ammonia to produce nitrogen ($N_2$) and hydrogen ($H_2$) is known in the art. Additionally, ammonia has the advantage of producing hydrogen without associated carbon dioxide formation. The process is simple and could inexpensively supply the hydrogen required at the paper mill 300.

In another embodiment, the hydrogen may be synthesized from methanol. In this embodiment, the methanol can be purchased and shipped to the paper mill 300. The synthesis of hydrogen from methanol is known in the art. Hydrogen generation from methanol involves passing methanol over traditional methanol synthesis catalysts (such as copper or zinc on alumina) at high temperature which would cause the methanol to convert to an equilibrium mixture of syngas and methanol. The syngas can be separated from the unconverted methanol (which is then recycled for further conversion) and then water-gas shifts by conventional means to hydrogen. In addition, as discussed above with respect to the refinery setting, the presence of carbon monoxide (CO) in the syngas can assist with the conversion of lignin similar to the effect seen for coal hydroprocessing with syngas compared to hydrogen alone.

In another embodiment, the reductant 306 can be generated from a small gasifier using scraps of "hog fuel" such as bark, or from the previously discussed water soluble portion of pyrolysis oil.

As discussed above, significant amounts of water 308 are produced as a result of the lignin 304 hydroprocessing. At the end of the hydroprocessing reaction, the water 308 will condense and separate from the biofuels feedstock 307. The water 308 extracts any salts which may be present in the lignin 304 thereby preventing fouling or deactivation of the catalyst. After the separation from the water 308, the biofuels feedstock 307 will also be separated and filtered to remove the catalyst for recycle (not shown).

The biofuels feedstock 307 will be primarily a diesel-like stream. The biofuels feedstock 307 can then be transported to a refinery (not shown) to produce a biofuel. As an alternative, the biofuels feedstock 307 could be used on site at the paper mill 300 for example in a co-generation plant (not shown).

In addition, like the refinery setting above, in the paper mill setting, dried biomass or pyrolysis oil may also be introduced into the hydroprocessor 301 with the lignin 304 for the production of a biofuels feedstock 307. In fact, the hydrogen requirement may be lowered by the inclusion of only the water-insoluble portion of pyrolysis oil, as discussed with respect to the refinery setting.

Figure 4:
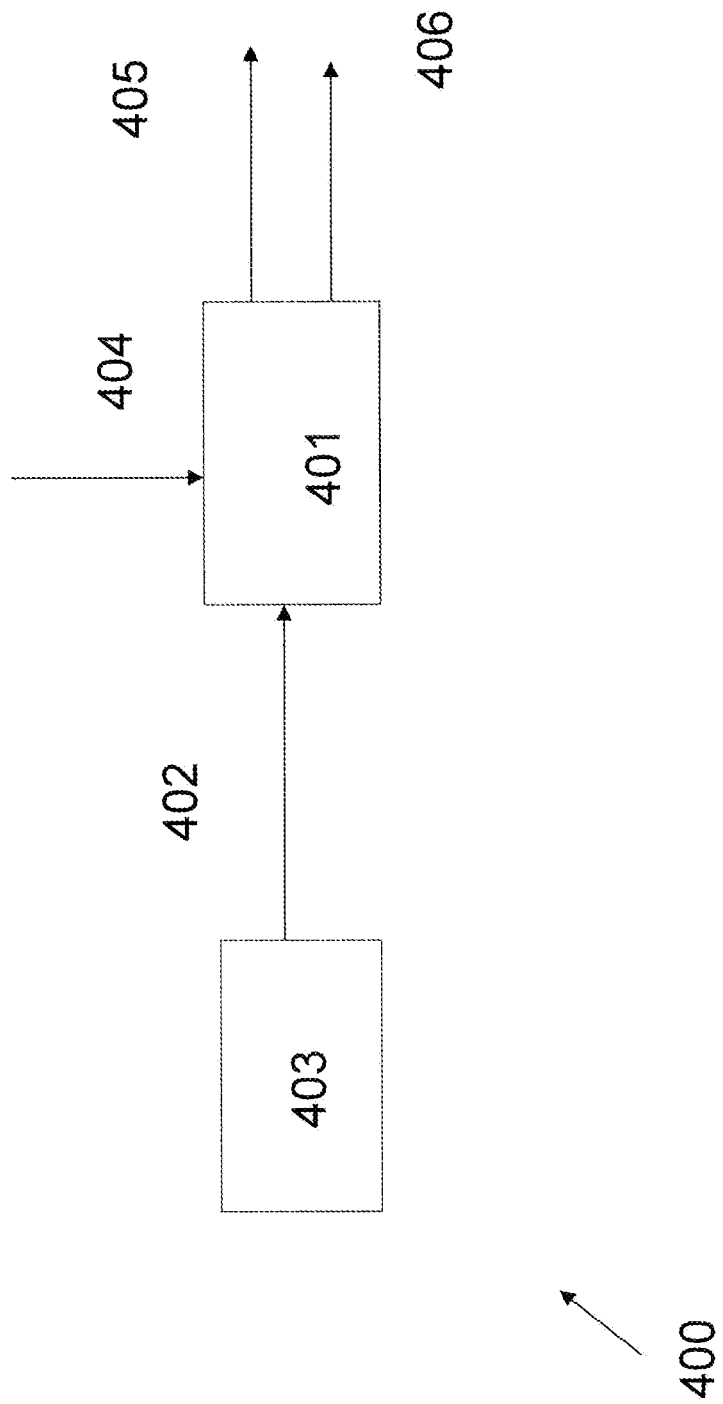
FIG. 4 depicts black liquor hydroprocessing in a paper mill setting.

In the second paper mill setting embodiment as depicted in FIG. 4, a hydroprocessor 401 is located on site at a paper mill 400. Black liquor 402 exits the pulp washers and is introduced into the multiple-effect evaporator system 403. Next, the black liquor 402 is introduced into the hydroprocessor 401 to generate a biofuels feedstock 405.

The hydroprocessing occurs using a reductant 404 and a catalyst at high temperature and pressure. Examples of hydroprocessing catalysts include molybdenum, cobalt, nickel, tungsten, iron and/or platinum on an amorphous or crystalline oxide matrix. Optionally a hydrocarbon solvent (not shown) can also be added as a slurry for the catalyst. Next, the reductant 404 is pressurized into the hydroprocessor 401.

At the end of the hydroprocessing reaction, the biofuels feedstock 405 is no longer miscible with water 406 and separates upon cooling to a second phase that is separated and filtered to remove the catalyst for recycle (not shown). The biofuels feedstock 405 is sent to a refinery (not shown) or for use elsewhere in the paper mill 400.

The water 405 from the hydroprocessing reaction contains the caustic salts that can be recycled to the papermaking process as the equivalent of green liquor or alternatively further treated (i.e. sent to a boiler) to reduce organic components and reject dissolved carbon dioxide. This is an alternative pathway to recycle the cooking liquor required in the papermaking process.

In addition, like the lignin embodiment above, in this embodiment, dried biomass or pyrolysis oil may also be introduced into the hydroprocessor 401 with the black liquor 402 for the production of a biofuels feedstock 405. However, it is anticipated that the introduction of pyrolysis oil may cause the lignin in the black liquor to precipitate. Therefore, the pyrolysis oil will typically have to be introduced slowly during the reaction or the pyrolysis oil may have to be added with a solvent to slurry the lignin. In addition, the hydrogen requirement may be lowered by the inclusion of only the water-insoluble portion of pyrolysis oil as compared to the entire pyrolysis oil, as discussed with respect to the refinery setting.

As discussed above, a benefit of hydroprocessing whole black liquor is the potential to increase the utilization of the organic components of black liquor. The carbon dioxide precipitation process discussed above to filter solid lignin from black liquor involves a titration to prevent the terpene, including pinene, and the tall oil fractions in the black liquor from being driven out of the solution. Both terpene and tall oil are oily materials capable of wetting the lignin and yield a tacky or oily product that would be difficult to handle. As a result, some lignin is unavoidably left in the black liquor which— reducing the separation yield. In addition, the terpene and the tall oil fractions are not utilized. By hydroprocessing the whole black liquor as an aqueous solution, a higher overall yield of biofuels feedstock will be harvested from the black liquor.

In the third paper mill setting embodiment, as depicted in FIG. 4A, black liquor 451 undergoes staged hydroprocessing. In this embodiment, there are two stages. Staged hydroprocessing may comprise a plurality of stages. The black liquor 451 is introduced into the first hydroprocessing stage 452 at the paper mill 450. In this embodiment, the first hydroprocessing stage 452 is used as a separation tool to separate the lignin 453 from the water and salts 454 in the black liquor. The hydroprocessing reaction, in the presence of a catalyst and a reductant 455, proceeds only far enough to cause phase separation and allow most of the water and salts 454 to be removed. Unlike complete hydroprocessing, the resulting stream, the separated lignin 453, is not primarily a diesel-like stream.

Next, the separated lignin 453 is introduced into the second hydroprocessing stage 456 for complete hydroprocessing in the presence of a catalyst and a reductant 457. This second hydroprocessing stage 456 can occur at the paper mill 450 or at a refinery (not shown).

At the end of the second hydroprocessing reaction at the paper mill, the biofuels feedstock 458 is no longer miscible with water 459 and separates upon cooling to a second phase which then is separated and filtered to remove the catalyst for recycle (not shown). The biofuels feedstock 458 is then sent to a refinery (not shown) to produce a biofuel. The biofuels feedstock 458 will be primarily a diesel-like stream.

In the alternative, the separated lignin 453 is a solid that can be shipped to a refinery for complete hydroprocessing as discussed above for the production of a biofuel.

While the methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A refinery process comprising: hydroprocessing refinery residuals and a lignin-containing feedstock to yield a biofuels feedstock, wherein the lignin-containing feedstock comprises lignin with phenolic polymers separated from black liquor from a pulping process wherein the lignin is separated from the black liquor from the pulping process by gaseous carbon dioxide ($CO_2$) injection, and wherein the biofuels feedstock has been reduced in oxygen content and average molecular weight relative to the lignin as a result of hydroprocessing of the lignin contained therein.

2. The refinery process of claim 1, wherein the pulping process comprises a kraft pulping process.

3. The refinery process of claim 1, wherein the lignin-containing feedstock further comprises dried biomass.

4. The refinery process of claim 1, wherein the lignin-containing feedstock further comprises one or more components selected from the group consisting of pyrolysis oil from forestry slash, by-products from cellulosic hydrolysis, by-products from fermentation, and combinations thereof.

5. The refinery process of claim 1, wherein the hydroprocessing involves a reductive gas selected from the group consisting of hydrogen, carbon monoxide, and combinations thereof.

6. The refinery process of claim 1, wherein the hydroprocessing involves a catalyst selected from the group consisting of molybdenum, cobalt, nickel, tungsten, iron, platinum, and combinations thereof on an amorphous or crystalline oxide matrix.

7. The refinery process of claim 1, wherein the hydroprocessing involves syngas as a reductant.

8. A refinery process comprising: hydroprocessing a lignin-containing feedstock to yield a biofuels feedstock, wherein the lignin-containing feedstock comprises spent cooking liquor with caustic salts and lignin with phenolic polymers, wherein the biofuels feedstock has been reduced in oxygen content and average molecular weight relative to the lignin as a result of hydroprocessing of the lignin contained therein, wherein the hydroprocessing efflux water contains the caustic salts from the spent cooking liquor, and wherein the lignin in the lignin-containing feedstock is not chemically modified prior to hydroprocessing.

9. The refinery process of claim 8, wherein the hydroprocessing comprises a plurality of hydroprocessing stages.

10. The refinery process of claim 8, wherein the pulping process comprises a kraft pulping process.

11. The refinery process of claim 8, wherein the lignin-containing feedstock further comprises one or more components selected from the group consisting of dried biomass, refinery residuals, and combinations thereof.

12. The refinery process of claim 8, wherein the lignin-containing feedstock further comprises one or more components selected from the group consisting of pyrolysis oil from forestry slash, by-products from cellulosic hydrolysis, by-products from fermentation, and combinations thereof.

13. The refinery process of claim 8, wherein the hydroprocessing involves a reductive gas selected from the group consisting of hydrogen, carbon monoxide, and combinations thereof.

14. The refinery process of claim 8, wherein the hydroprocessing step involves a catalyst selected from the group consisting of molybdenum, cobalt, nickel, tungsten, iron, platinum, and combinations thereof on an amorphous or crystalline oxide matrix.

15. The refinery process of claim 8, further comprising recycling and recovering salt components of the black liquor by recycling the water containing caustic salts to a paper mill as green liquor.

16. The refinery process of claim 8, wherein the hydroprocessing involves syngas as a reductant.

17. The refinery process of claim 8, further comprising recycling and recovering salt components of the black liquor by sending the water containing caustic salts to a boiler to reduce organic components and reject dissolved carbon dioxide.

18. A method of producing a reduced oxygen content biofuel feedstock from black liquor comprising:
receiving black liquor comprising lignin with phenolic polymers and inorganic salts;
separating the lignin from the inorganic salts;
hydroprocessing the separated lignin with phenolic polymers in a hydroprocessor to yield a reduced oxygen content biofuel feedstock, wherein the separated lignin is not chemically modified prior to hydroprocessing; and
introducing the biofuel feedstock into a refinery for biofuels synthesis, wherein the biofuels feedstock is introduced into the refinery in combination with other refinery streams.

19. The method of claim 18, wherein separating the lignin from the inorganic salts comprises gaseous $CO_2$ injection.

20. The method of claim 18, wherein the reduced oxygen content biofuel comprises oxygenated hydrocarbons.

* * * * *